Patented Jan. 23, 1923.

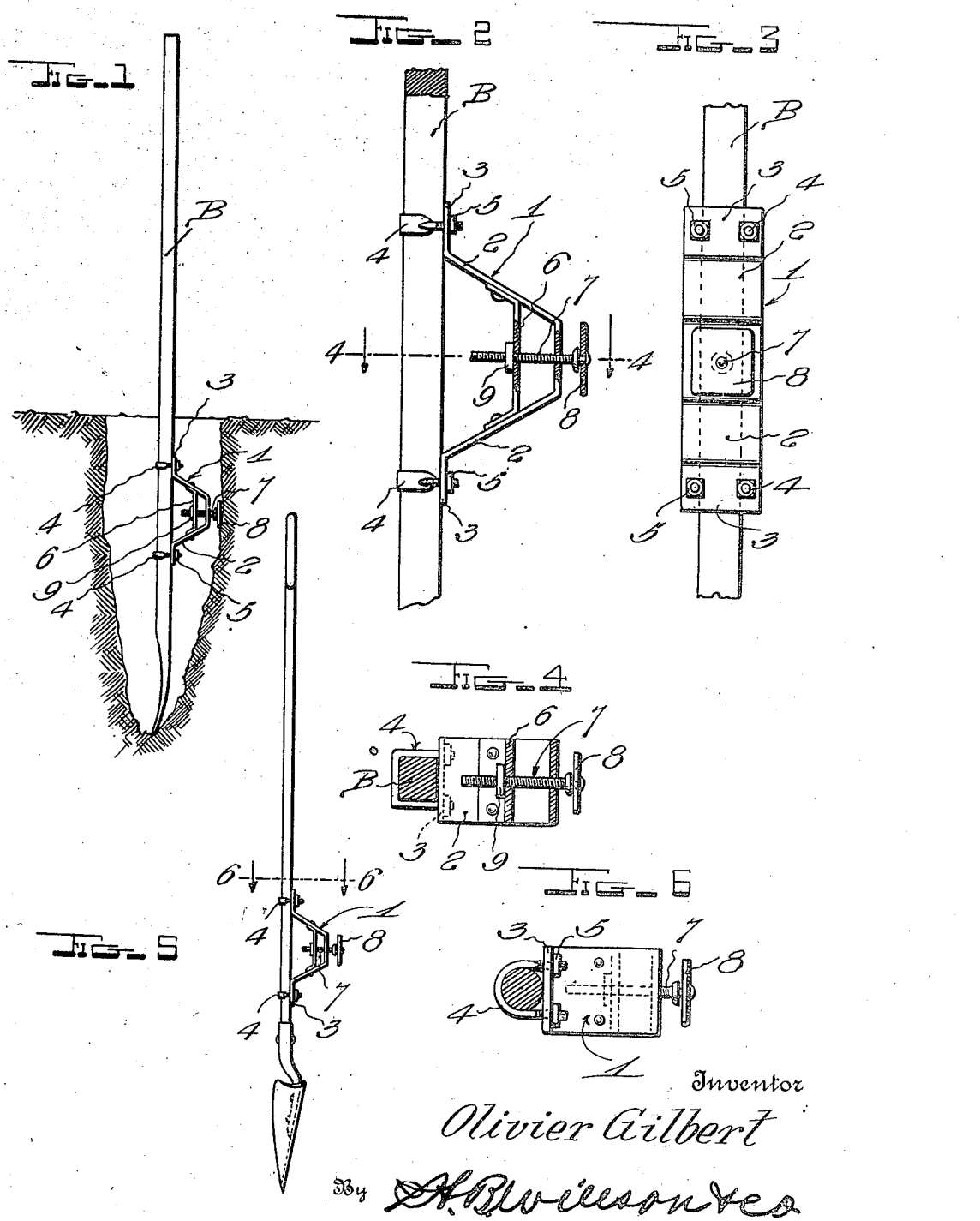

1,442,883

UNITED STATES PATENT OFFICE.

OLIVIER GILBERT, OF LEWISTON, MAINE.

DEVICE FOR DIGGING POSTHOLES.

Application filed December 19, 1921. Serial No. 523,516.

*To all whom it may concern:*

Be it known that I, OLIVIER GILBERT, a subject of the King of Great Britain, residing at Lewiston, in the county of Androscoggin and State of Maine, have invented certain new and useful Improvements in Devices for Digging Postholes; and I do declare the following to be a full, clear, and exact description of the invention, such as will enable others skilled in the art to which it appertains to make and use the same.

This invention relates broadly to an improved device for digging post holes and the like, but has more particular reference to an attachment for such a device, this attachment being such that it provides a fulcrum for the device to enable the holes to be more effectively dug, to provide better leverage, to enable the task to be accomplished more easily, and to space the handle of the implement or device from the wall of the hole to prevent the latter from being damaged, as is the case when the handle of the implement is rested against it.

One object of the invention is to detachably connect the attachment to the handle of the implement in such a manner that it is capable of vertical adjustment on said handle. Hence, the leverage can be changed from time to time by shifting the attachment and the work made much easier.

Another feature of the invention is to provide an attachment embodying a fulcrum which is adjustable toward and from the handle to enable the latter to be spaced different distances from the wall of the hole and to permit the device to be used in different diameters of holes.

A further feature and object of the invention is to construct an attachment of this class which is strong, durable, easy to adjust, attach and detach, and so simple that it can be manufactured and sold at a comparatively low cost.

Other objects and advantages of the invention will be apparent during the course of the following description.

In the accompanying drawings forming a part of this specification and in which like numerals are employed to designate like parts throughout the same:

Figure 1 is an elevational view of an ordinary crow-bar showing the improved attachment associated therewith and disclosing the manner of use.

Figure 2 is an enlarged detail view of the attachment with parts in section.

Figure 3 is an end elevational view looking toward the head of the fulcrum member.

Figure 4 is a horizontal section taken substantially on the plane of the line 4—4 of Fig. 2.

Figure 5 is an elevational view of a conventional type of post hole digger or shovel equipped with the attachment.

Figure 6 is an enlarged sectional view taken substantially on the plane of the line 6—6 of Fig. 5.

Before proceeding with the detailed description, I wish to point out that the improved attachment is adapted for use on crow-bars, shovels, spades and many other types of implements of like construction and it is particularly, but not necessarily, designed for use when digging post holes, although it can be well used on other forms of implements employed for other excavating purposes. Inasmuch as the shapes of the handles, to which the device is designed to be connected, will vary in design and shape, I do not wish to be restricted to any particular kind of clamps for retaining the attachment in place and these will vary to meet the particular requirements. As before indicated, in the drawings, I have illustrated the improved attachment as being used on a crow-bar and a shovel. For the sake of clearness of description, we will confine attention more or less to the use of the invention on a crow bar as shown in Fig. 1.

Broadly speaking, the invention comprises a combined fulcrum and spacing member adapted to be adjustably connected to the handle of the implement, the member being adapted to bear against the wall of the hole and be connected with the intermediate portion of the handle of the implement to enable the latter to be conveniently manipulated without disturbing the desired circular contour of the hole.

In its specific and preferred embodiment, the improved attachment comprises an attaching frame 1 including spaced divergent arms 2 having their outer free ends directed laterally as indicated at 3 to enable them to bear against one side of the flat faced crowbar B. By referring to the sectional view in Fig. 4 it will be seen that these laterally bent ends of the arms are considerably wider than the crow-bar and are formed with apertures for passage of the screw-threaded ends of the U-shaped clamps 4. Binding nuts 5 are arranged on the threaded ends of the clamp arms and bear against the ends 3 of the frame arms and serve to hold the entire device in position on the bar. It may be conveniently stated here that by simply loosening these nuts, the frame can be shifted down on the crow-bar to position the device at the desired point for varying the leverage and to permit it to be arranged as desired when the hole increases in depth. Referring again to the part of the attachment named, it will be seen that it includes a cross-piece 6 secured to and decidedly bracing the arms of the frame. It will also be seen that this cross-piece and connecting portion of the frame are formed with alined screw-threaded holes through which a screw 7 passes. By carefully examining this screw it will be seen that it is equipped at its outer end with a plate 8 forming a head, this head being adapted to rest against the wall of the hole as shown in Figure 1. A lock nut 9 is provided for preventing accidental movement of the screw in one direction after it has been properly set. This screw taken together with the head plate forms what may be broadly considered as a fulcrum and the frame and clamps constitute the means for adjustably and detachably connecting this fulcrum to the handle of the implement.

In use, the nuts 5 are loosened and the attachment is adjusted to the desired point on the intermediate portion of the crow-bar after the hole is started with a spade or the like. As a hole is dug some little distance below the surface, it becomes rather hard to manipulate a crow bar or post hole digger because of the fact that the handle is permitted to rest against the wall of the hole which ordinarily constitutes the fulcrum therefor. When the implement is used in the usual way, undesirable grooves are formed in the wall of the hole and the contour is damaged to an undesirable shape. However, by placing the attachment in the approximate position shown and permitting the head of the fulcrum to rest against the wall of the hole, the crow-bar is spaced away from and prevented from contacting with such wall. The fulcrum member can be adjusted toward and from the crow-bar to accommodate the particular size of hole in which the device is used and as the hole is dug deeper, the device is moved vertically upward on the handle to position it near the top of the hole where the best leverage can, in all probability, be obtained.

Having carefully considered the drawings, it will be seen that the only difference between the type of devices disclosed in Figs. 1 to 4 and Figs. 5 and 6 is in the different shape of the retaining clamps 4. It therefore follows that like reference characters are employed to designate all like parts of the device in all figures. As before pointed out, the particular forms of the attaching clamps are immaterial and these may be shaped to fit the particular kind of implement on which the improved attachment is used.

The several features and advantages of the invention have doubtless been made clear from the foregoing description and drawings. The manner of using the device has also been clearly set forth. Therefore, a more lengthy and detailed description is thought unnecessary.

Since probably the best results may be obtained with the construction and arrangement herein shown and described, this is taken as the preferred embodiment of the invention. However, I wish it to be understood that minor changes coming within the scope of the invention as claimed may be resorted to if desired.

I claim:

1. In combination, an implement for digging post holes, and a fulcrum connected to the handle thereof, said fulcrum being rigid with respect to the handle and being vertically adjustable thereon to vary the leverage as the hole is dug deeper and extending at a right angle from the handle to bear against the wall of the hole to space the handle from said wall.

2. In combination, an implement for digging holes in the ground, and a fulcrum to bear against the wall of the hole to space the handle therefrom, said fulcrum being adjustable toward and from the handle to operate effectively in different diameters of holes.

3. In combination, an implement for digging holes in the ground, an attaching frame connected thereto, and a horizontally disposed fulcrum screw adjustably connected with said frame and provided at one end with a head adapted to bear against the wall of the hole.

4. In combination, a post hole digging implement having a relatively long handle, a radially adjustable fulcrum member, and a bracket for connecting said member to the handle of the implement, said bracket having adjustable connection with the handle to vary the leverage and to change the position of the fulcrum member as the hole is dug deeper.

5. An attachment of the class described comprising a frame to be mounted on the handle of a post hole digging implement, said frame having adjustable connection with the handle to permit it to be moved vertically to vary the leverage and to permit its position to be changed as the hole is dug deeper, and a radially adjustable fulcrum carried by said frame to engage the wall of the hole.

6. An attachment of the class described comprising a screw constituting a fulcrum, said screw being provided at one end with a head adapted to bear against the wall of a hole, and means for connecting said screw with an implement for digging holes.

7. An attachment of the class described comprising an attaching bracket embodying spaced arms having their free ends directed laterally outward and away from each other, said laterally directed ends being adapted to bear against the handle of an implement, means for connecting said ends with said handle, said means being adjustable to permit the bracket to be raised and lowered on the handle to vary the leverage, and a radially adjustable fulcrum member carried by said bracket, said member being adapted to bear against the wall of the hole.

8. An attachment of the class described comprising an attaching frame embodying spaced divergent arms having their free ends directed laterally away from each other and adapted to bear against an implement for digging holes in the ground, a cross-piece connected at its ends with said arms for bracing the latter, the connecting portion of said frame and said cross piece being formed with alined screw threaded holes, a screw passing through said holes and constituting a fulcrum, said screw being provided on its outer end with a head adapted to rest against the inner face of the wall of the hole, and clamps associated with the laterally bent ends of said arms.

In testimony whereof I have hereunto set my hand.

OLIVIER GILBERT.